(12) United States Patent
Obata et al.

(10) Patent No.: US 12,723,860 B2
(45) Date of Patent: Sep. 1, 2026

(54) DISPLACEMENT SENSOR HAVING DETACHABLE COVER SHEET

(71) Applicant: Murata Manufacturing Co., Ltd., Nagaokakyo (JP)

(72) Inventors: Takayoshi Obata, Nagaokakyo (JP); Tomoki Ouchi, Nagaokakyo (JP)

(73) Assignee: MURATA MANUFACTURING CO., LTD., Nagaokakyo (JP)

( * ) Notice: Subject to any disclaimer, the term of this patent is extended or adjusted under 35 U.S.C. 154(b) by 365 days.

(21) Appl. No.: 18/480,814

(22) Filed: Oct. 4, 2023

(65) Prior Publication Data

US 2024/0142218 A1 May 2, 2024

(30) Foreign Application Priority Data

Oct. 28, 2022 (JP) ................................ 2022-173539
Aug. 1, 2023 (JP) ................................ 2023-125444

(51) Int. Cl.
*G01B 7/16* (2006.01)

(52) U.S. Cl.
CPC ..................................... *G01B 7/18* (2013.01)

(58) Field of Classification Search
CPC . G01L 1/06; G01L 1/26; G01L 1/2287; G01L 1/18; G01L 1/2281; G01L 1/2268; G01B 7/18; G01B 5/30
See application file for complete search history.

(56) References Cited

U.S. PATENT DOCUMENTS 3,080,748 A * 3/1963 Burkley .................. G01B 7/16 73/768
3,621,436 A * 11/1971 Wu ...................... G01L 1/2287 338/3
5,522,270 A * 6/1996 Gissinger ................ G01B 5/30 73/862.627
5,652,395 A * 7/1997 Hirano .................. G01N 3/066 73/849
6,269,534 B1 * 8/2001 Mattmann ............. H01C 17/07 338/4
6,810,753 B2 * 11/2004 Valdevit .............. A61B 5/4528 73/862.045
6,829,945 B2 * 12/2004 Gilch ................... G01L 1/2206 73/777
8,166,796 B2 * 5/2012 Clark .................... G01Q 40/00 73/1.79
8,336,399 B2 * 12/2012 Muroyama ............ G01L 1/146 73/862.046
8,613,231 B2 * 12/2013 Muroyama ............ G01L 5/228 73/862

(Continued)

FOREIGN PATENT DOCUMENTS

JP 2020008397 A 1/2020

*Primary Examiner* — Tran M. Tran
(74) *Attorney, Agent, or Firm* — ArentFox Schiff LLP

(57) ABSTRACT

A displacement sensor that includes: a sensor unit including a base member having a first main surface and a second main surface opposite the first main surface, and a sensor sheet on the first main surface of the base member, the sensor sheet configured to measure a displacement amount of the base member; and a first cover sheet detachably attached to the sensor sheet on a side thereof opposite to the base member, wherein an elastic modulus of the first cover sheet is larger than an elastic modulus of the base member.

20 Claims, 3 Drawing Sheets

(56) References Cited

U.S. PATENT DOCUMENTS 8,770,045 B2 * 7/2014 Murayama ................ G01L 1/20
73/431
8,890,649 B2 * 11/2014 Saitou ................ G01M 5/0041
702/155
8,931,351 B2 * 1/2015 Muramatsu .............. G01B 1/00
73/849
9,212,895 B2 * 12/2015 Suzuki ..................... G01B 7/18
10,285,266 B2 * 5/2019 Kamakura ......... A61B 5/02438
10,302,459 B2 * 5/2019 Huang ................... H05K 1/111
10,473,538 B2 * 11/2019 Lai ........................ G06F 3/0418
10,557,759 B2 * 2/2020 Hsieh ........................ G01L 1/26
10,760,892 B2 * 9/2020 Kamakura ............... G01B 7/18
10,908,034 B2 * 2/2021 Moriura .................. G01L 5/221
11,041,768 B2 * 6/2021 Takagi .................. G01L 1/2287
11,162,851 B2 * 11/2021 Li ........................... G01L 1/127
11,215,516 B2 * 1/2022 Obata ..................... G01L 1/205
11,499,877 B2 * 11/2022 Misaizu ................ G01L 1/2262
11,543,307 B1 * 1/2023 Xie ........................ G01H 11/06
11,617,558 B2 * 4/2023 Alshareef ................ A61B 5/11
600/586
11,619,554 B2 * 4/2023 Ronay ..................... G01L 1/205
73/862.381
11,690,415 B2 * 7/2023 Bae .................... A41D 19/0024
702/150
11,712,194 B2 * 8/2023 Shimuta ............... A61B 5/6832
600/595
11,841,282 B2 * 12/2023 Zhu ........................... G01L 1/26
12,013,298 B2 * 6/2024 Jacobsen ............. G01L 19/0645
12,038,274 B2 * 7/2024 Turunen ................. H05K 3/326
12,193,829 B2 * 1/2025 Shimuta ................. A61B 7/003
12,220,227 B2 * 2/2025 Carbo, Jr. ............ H05K 1/0283
12,259,286 B2 * 3/2025 Lee ........................ H01H 3/142
12,306,053 B2 * 5/2025 Takimoto .............. G01L 1/2287
2009/0199650 A1 * 8/2009 Shimazu .................. G01B 7/18
73/777
2010/0263462 A1 * 10/2010 Nakamura ............... G01D 1/00
73/866.5
2011/0307214 A1 * 12/2011 Saitou ..................... G01L 1/205
702/155
2021/0310883 A1 * 10/2021 Obata ..................... G01L 1/205
2024/0003762 A1 * 1/2024 Yasui .................. C23C 14/0036
2024/0298958 A1 * 9/2024 Suzuki ................. A61B 5/4205
2024/0398307 A1 * 12/2024 Nishiyama ............. A61B 5/257
2025/0164327 A1 * 5/2025 Rao ....................... G01L 5/0019
2025/0216276 A1 * 7/2025 Karasawa ............. G01L 1/2287
2025/0314540 A1 * 10/2025 Deng .................... G01L 1/2287

* cited by examiner

DISPLACEMENT SENSOR HAVING DETACHABLE COVER SHEET

CROSS REFERENCE TO RELATED APPLICATIONS

The present application claims priority to Japanese Patent Application No. 2022-173539, filed Oct. 28, 2022, and Japanese Patent Application No. 2023-125444, filed Aug. 1, 2023, the entire contents of each of which are incorporated herein by reference.

BACKGROUND OF THE INVENTION

Field of the Invention

The present invention relates to a displacement sensor.

Description of the Related Art

A strain sensor described in Japanese Unexamined Patent Application Publication No. 2020-008397 includes a base plate having a plate shape and a sensor element having a film shape. The sensor element is laminated on one main surface of the base plate. The sensor element includes a first protective film, a first electrode, a piezoelectric film, a second electrode, and a second protective film. The sensor element has a structure in which these members are laminated in the order described above.

When a strain sensor as described in Japanese Patent Application Publication No. 2020-008397 is stored, the strain sensor may be stored in a curved state. When the strain sensor is curved in this manner, a part of the curve may remain as an irreversible curve of a sensor sheet. In this case, since characteristics of the sensor sheet will change, there is a possibility that detection accuracy of the strain sensor is adversely affected.

SUMMARY OF THE INVENTION

According to an aspect of the present invention, there is provided a displacement sensor including: a sensor unit including a base member having a first main surface and a second main surface opposite the first main surface, and a sensor sheet on the first main surface of the base member, the sensor sheet configured to measure a displacement amount of the base member; and a first cover sheet detachably attached to the sensor sheet on a side thereof opposite to the base member, wherein an elastic modulus of the first cover sheet is larger than an elastic modulus of the base member.

According to another aspect of the present invention, there is provided a displacement sensor including: a sensor unit including a base member having a first main surface and a second main surface opposite the first main surface, and a sensor sheet on the first main surface of the base member, the sensor sheet configured to measure a displacement amount of the base member; and a cover sheet detachably disposed on a side of the second main surface of the base member, wherein an elastic modulus of the cover sheet is larger than an elastic modulus of the base member.

According to the above configuration, the cover sheet is less likely to deform than the base member. Thus, since the cover sheet is disposed on the sensor unit, the curve of the base member can be suppressed. That is, the curve of the sensor sheet positioned on the first main surface of the base member can be suppressed. As a result, a change in sensor characteristics can be suppressed during storage or the like of the displacement sensor.

The curve of the displacement sensor can be suppressed, and the change in sensor characteristics can be suppressed.

DESCRIPTION OF THE PREFERRED EMBODIMENTS

First Embodiment

Figure 1:
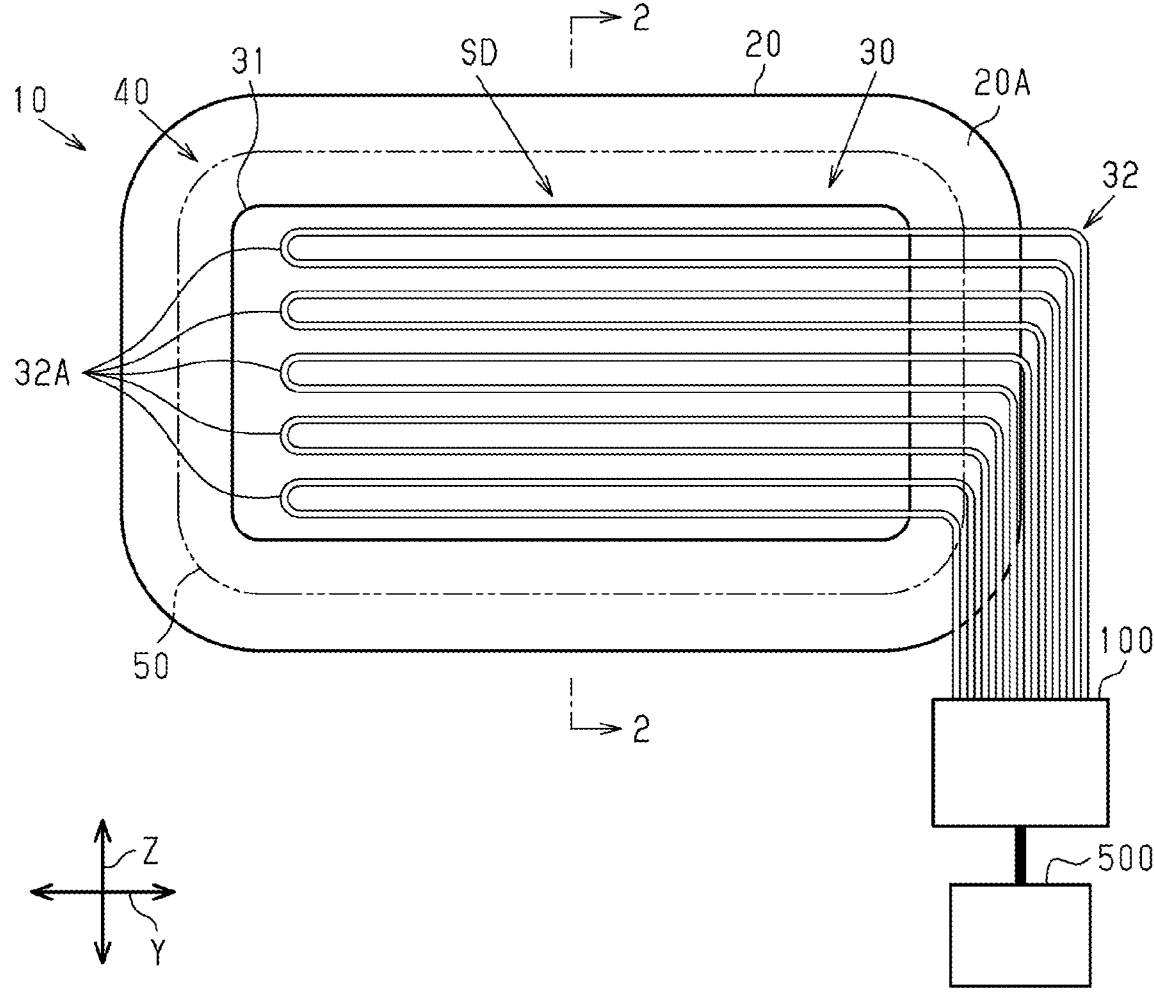
FIG. 1 is a plan view of a displacement sensor according to a first embodiment.

Hereinafter, a first embodiment for a displacement sensor will be described. Note that in the drawings, constituent elements may be illustrated in an enlarged manner for easy understanding. Dimensional ratios of the constituent elements may be different from the actual ratios or from ratios in other figures.

Overall Configuration

As illustrated in FIG. 1, a displacement sensor 10 includes a sensor unit SD and a terminal 100. Further, as illustrated in FIG. 2, the displacement sensor 10 includes a first cover sheet 50 and an adhesive sheet 90.

Figure 2:
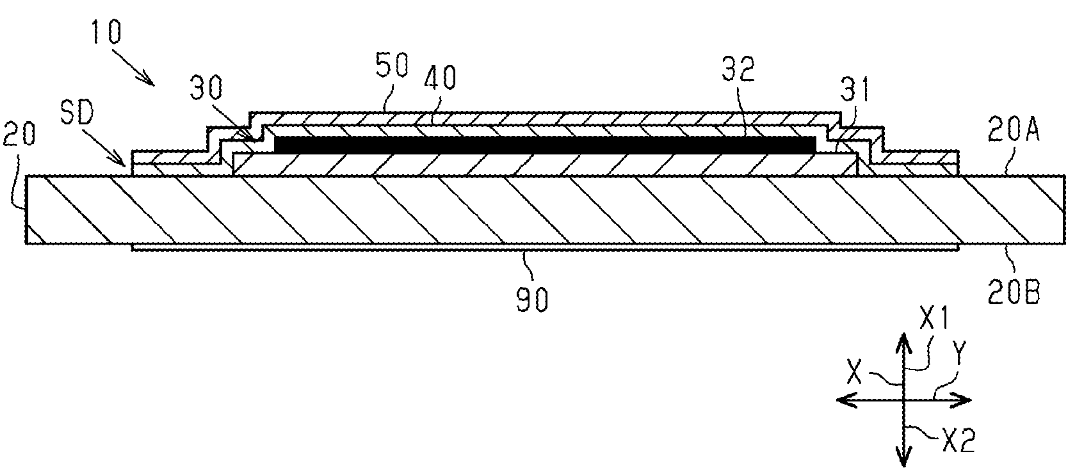
FIG. 2 is a cross-sectional view taken along a line 2-2 in FIG. 1.

As illustrated in FIG. 2, the sensor unit SD includes a base member 20, a sensor sheet 30, and a protective sheet 40.

The base member 20 has a plate shape. The base member 20 includes a first main surface 20A and a second main surface 20B opposite to the first main surface 20A. As illustrated in FIG. 1, when the base member 20 is viewed from a normal direction of the first main surface 20A, the first main surface 20A has a substantially rectangular shape as a whole. A material of the base member 20 is, for example, a soft foam material such as rubber sponge. The minimum dimension from the first main surface 20A to the second main surface 20B of the base member 20, that is, a thickness of the base member 20 is about several millimeters.

Note that in the following description, as illustrated in FIG. 2, an axis along a normal direction of the first main surface 20A is referred to as a first axis X. Additionally, as illustrated in FIG. 1, an axis parallel to a long side of the first main surface 20A is defined as a second axis Y. Further, an axis parallel to a short side of the first main surface 20A is defined as a third axis Z. Then, as illustrated in FIG. 2, among directions along the first axis X, a direction in which the first main surface 20A faces is defined as a first positive direction X1, and a direction in which the second main surface 20B faces is defined as a first negative direction X2.

As illustrated in FIG. 2, the sensor sheet 30 has a plate shape as a whole. The sensor sheet 30 is disposed on the first main surface 20A of the base member 20. The sensor sheet 30 is fixed to the base member 20.

As illustrated in FIG. 1, the sensor sheet 30 includes a base material 31 and five sensor elements 32.

The base material 31 has a plate shape. A material of the base material 31 is, for example, synthetic resin having stretchability. Specific examples of the material of the base material 31 include polyurethane, acrylic resin, and silicone resin. A dimension of the base material 31 in the direction along the first axis X, that is, a thickness of the base material 31 is, for example, about 40 μm.

As illustrated in FIG. 2, the base material 31 is directly laminated on the first main surface 20A of the base member 20. Additionally, the base material 31 is secured to the first main surface 20A of the base member 20. Thus, the base material 31 is unremovable from the base member 20. Note that, here, "unremovable" means that it is difficult to remove the base material 31 from the base member 20 without damaging the sensor sheet 30 or the base member 20.

As illustrated in FIG. 1, when the base material 31 is viewed by a viewer facing the first negative direction X2, the base material 31 has a substantially rectangular shape. A long side of the base material 31 is parallel to the second axis Y. A short side of the base material 31 is parallel to the third axis Z. The long side of the base material 31 is shorter than the long side of the base member 20. Further, the short side of the base material 31 is shorter than the short side of the base member 20. Furthermore, when viewed by the viewer facing the first negative direction X2, the entire region of the base material 31 is within the range of the base member 20. Specifically, a geometric center of the base material 31 and a geometric center of the base member 20 coincide with each other. The base material 31 can be curved together with the base member 20 according to the curve of the base member 20.

As illustrated in FIG. 1, each sensor element 32 has a linear shape. A material of each sensor element 32 is a conductor whose resistance value largely changes with respect to the expansion and contraction of the sensor element 32. Specifically, the material of each sensor element 32 is, for example, a mixture of metal powder such as silver or copper and elastomer resin such as silicone.

As illustrated in FIG. 2, a part of each of the sensor elements 32 is directly secured to a surface of the base material 31 on a side of the first positive direction X1. Additionally, each of the sensor elements 32 is unremovable from the base material 31. Note that in FIG. 2, the five sensor elements 32 are illustrated as one member in a simplified manner.

As illustrated in FIG. 1, a first end of each sensor element 32 is connected to the terminal 100. Then, when each sensor element 32 is traced from the first end, the sensor element 32 reaches on the base material 31 from the first end, extends parallel to the second axis Y on the base material 31, is folded back by 180 degrees in the middle, and extends parallel to the second axis Y again. In addition, a second end of the sensor element 32 is connected to the terminal 100.

As illustrated in FIG. 1, each of the five sensor elements 32 includes a detection portion 32A. The detection portion 32A is a portion of the sensor element 32 extending parallel to the second axis Y, the portion including a folded portion on the base material 31 described above. The detection portions 32A of the five sensor elements 32 are arranged in parallel to each other. That is, the detection portions 32A of the five sensor elements 32 are arranged in a direction along the third axis Z. Additionally, the detection portions 32A of the sensor elements 32 are arranged at equal intervals. The sensor elements 32 can be curved together with the base material 31 according to the curve of the base material 31.

A resistance value of the sensor element 32 changes as a length of the sensor element 32 changes according to the curve of the detection portion 32A. The sensor element 32 can measure a magnitude of the curve of an object to be measured by detecting the change in the resistance value. That is, the sensor element 32 is an element capable of detecting strain. For example, the sensor element 32 has a linear shape in a state where no force is applied from the outside. Then, the sensor element 32 curves by a force acting thereon from the outside. Additionally, as described above, the sensor element 32 curves following the curve of the base material 31. Then, the base material 31 curves following the curve of the base member 20. Thus, each sensor element 32 can measure a degree of the curve of the base member 20 as a displacement amount.

The terminal 100 is connectable to an external device 500. The external device 500 is connected to the terminal 100 through a multiaxial cable. The external device 500 applies a predetermined voltage to each sensor element 32 via the terminal 100. Further, the external device 500 measures a current value of each sensor element 32 when a voltage is applied to each sensor element 32. The external device 500 measures a resistance value of each sensor element 32 based on the measured current value of each sensor element 32.

As illustrated in FIG. 2, the protective sheet 40 has a plate shape. The protective sheet 40 is made of synthetic resin having stretchability. In the present embodiment, the material of the protective sheet 40 is the same as the material of the base material 31.

The protective sheet 40 is disposed directly on a surface of the sensor sheet 30 on the side in the first positive direction X1 and a surface of the base member 20 on the side in the first positive direction X1. The protective sheet 40 is positioned between the sensor sheet 30 and the first cover sheet 50, which will be described later. The protective sheet 40 is secured to the surface of the sensor sheet 30 on the side of the first positive direction X1 and the surface of the base member 20 on the side of the first positive direction X1. Thus, the protective sheet 40 is unremovable from the sensor sheet 30 and the base member 20.

As illustrated in FIG. 1, when the protective sheet 40 is viewed by the viewer facing the first negative direction X2, the protective sheet 40 has a substantially rectangular shape. A long side of the protective sheet 40 is longer than the long side of the base material 31. Additionally, a short side of the protective sheet 40 is longer than the short side of the base material 31. Then, the protective sheet 40 covers the entire region of the sensor sheet 30 in plan view facing the first negative direction X2. Note that the long side of the protective sheet 40 is shorter than the long side of the base member 20. Further, the short side of the protective sheet 40 is shorter than the short side of the base member 20. Thus, the protective sheet 40 is within a range of the base member 20. A geometric center of the protective sheet 40 and the geometric center of the base member 20 coincide with each other. The protective sheet 40 can be curved together with the sensor sheet 30 according to the curve of the sensor sheet 30. A dimension of the protective sheet 40 in the direction along the first axis X, that is, a thickness of the protective sheet 40 is, for example, about 20 μm.

As illustrated in FIG. 2, the adhesive sheet 90 has a plate shape. The adhesive sheet 90 is directly adhered to the second main surface 20B of the base member 20. Although not illustrated, the adhesive sheet 90 has a substantially rectangular shape when the adhesive sheet 90 is viewed by the viewer facing the first positive direction X1. A long side of the adhesive sheet 90 is shorter than the long side of the base member 20. Additionally, a short side of the adhesive sheet 90 is shorter than the short side of the base member 20. Thus, the adhesive sheet 90 is within the range of the base member 20. A geometric center of the adhesive sheet 90 and the geometric center of the base member 20 coincide with each other. The adhesive sheet 90 can be curved together with the sensor sheet 30 according to the curve of the sensor sheet 30. Note that a thickness of the adhesive sheet 90 is much thinner than thicknesses of the other sheets. The surface of the adhesive sheet 90 on the side of the first negative direction X2 has adhesiveness to another object. In addition, an adhesive strength of the adhesive sheet 90 is an adhesive strength to such an extent that the adhesive sheet 90 can be removed again after being adhered to a measurement target of the displacement sensor 10.

As illustrated in FIG. 2, the first cover sheet 50 has a plate shape. The first cover sheet 50 is directly laminated on the surface of the protective sheet 40 on the side of the first positive direction X1. That is, the first cover sheet 50 is disposed on a side opposite to the base member 20 to the sensor sheet 30.

As illustrated in FIG. 1, when the first cover sheet 50 is viewed by the viewer facing in the first negative direction X2, the first cover sheet 50 has a substantially rectangular shape. In plan view facing the first negative direction X2, the first cover sheet 50 has substantially the same dimensions and shape as those of the protective sheet 40. Further, the first cover sheet 50 covers the entire region of the sensor sheet 30 in plan view facing the first negative direction X2. A dimension of the first cover sheet 50 in the direction along the first axis X, that is, a thickness of the first cover sheet 50 is, for example, equal to or less than 0.1 mm.

An adhesive strength of the first cover sheet 50 to the protective sheet 40 is sufficiently smaller than an adhesive strength of the protective sheet 40 to the base member 20 and the sensor sheet 30. Specifically, the first cover sheet 50 is adhered to the protective sheet 40 by static electricity. Thus, the first cover sheet 50 can be easily detached from the protective sheet 40 by using a force by fingers or the like, and can be attached to the protective sheet 40 again after being detached. That is, the first cover sheet 50 is detachable from the protective sheet 40. A material of the first cover sheet 50 is non-stretchable synthetic resin such as polyethylene terephthalate.

Elastic Modulus

An elastic modulus of the first cover sheet 50 is larger than an elastic modulus of the sensor unit SD. That is, the elastic modulus of the first cover sheet 50 is larger than an elastic modulus of the base member 20, an elastic modulus of the sensor sheet 30, and an elastic modulus of the protective sheet 40. That is, the first cover sheet 50 is harder than the sensor unit SD. Note that the elastic modulus of the adhesive sheet 90 is smaller than all of the elastic modulus of the first cover sheet 50, the elastic modulus of the sensor sheet 30, the elastic modulus of the protective sheet 40, and the elastic modulus of the base member 20.

Note that a relationship between the elastic moduli of the respective members described above can be confirmed by the following tensile test.

Figure 3:
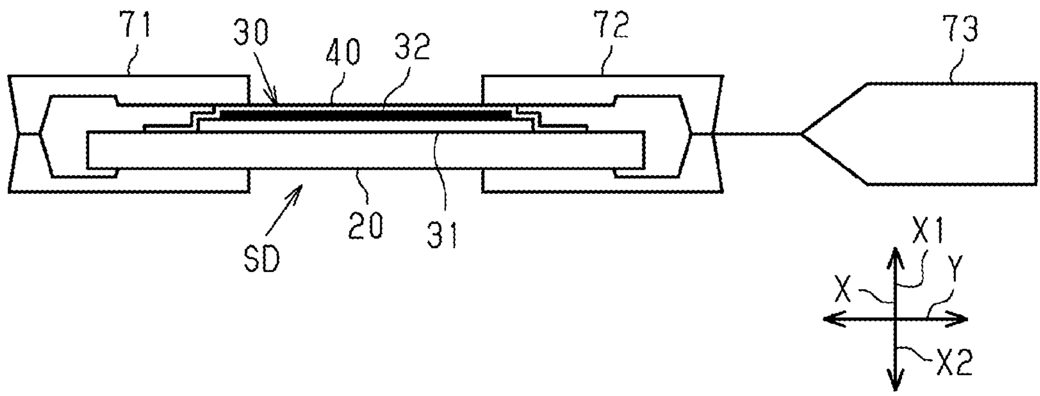
FIG. 3 is a diagram for describing a tensile test in the first embodiment.

As illustrated in FIG. 3, one end of the sensor unit SD in the direction along the second axis Y is fixed to a first clamp 71. Also, Similarly, the other end of the sensor unit SD in the direction along the second axis Y is fixed to another second clamp 72. At this time, the first clamp 71 and the second clamp 72 are aligned with the sensor unit SD so that the first clamp 71 and the second clamp 72 can sandwich all of the base member 20, the protective sheet 40, the base material 31, and the sensor elements 32.

Further, a force gauge 73 is attached to the second clamp 72. Then, in this state, when the force gauge 73 is pulled in a direction away from the first clamp 71 along the second axis Y, a tensile load detected by the force gauge 73 is set to a specific constant value. Then, in this manner, an elongation amount of the sensor sheet 30 in the direction parallel to the second axis Y when the tensile load of a constant value is applied to the sensor unit SD is measured. This measurement can measure the elongation amount of the sensor unit SD including the base member 20, the sensor sheet 30, and the protective sheet 40. The elongation amount of the sensor unit SD when the tensile load of the constant value is applied is smaller than an elongation amount of the base member 20 alone, is smaller than an elongation amount of the sensor sheet 30 alone, and is smaller than an elongation amount of the protective sheet alone.

In a similar manner to the above-described tensile test, not only the elongation amount of the sensor unit SD but also the elongation amount of the base member 20 and the elongation amount of the first cover sheet 50 are measured.

The elongation amount of the base member 20 can be measured by aligning the first clamp 71 and the second clamp 72 at positions where the first clamp 71 and the second clamp 72 clamp only an end portion of the base member 20 and do not clamp the sensor sheet 30 and the protective sheet 40. In a case where the protective sheet 40 covers the entire first main surface 20A of the base member 20, a portion of the protective sheet 40 may be cut off, and the first clamp 71 and the second clamp 72 may be positioned at the cut portion.

Then, it is possible to confirm which member has a higher elastic modulus based on magnitude relationships among the elongation amounts of these members. For example, when the elongation amount of the first cover sheet 50 is smaller than the elongation amount of the sensor unit SD, it can be said that the elastic modulus of the first cover sheet 50 is larger than the elastic modulus of the sensor unit SD. Additionally, the elongation amount of the sensor unit SD is smaller than the elongation amount of the base member 20 alone, is smaller than the elongation amount of the sensor sheet 30 alone, and is smaller than the elongation amount of the protective sheet 40. Thus, it can be said that the elastic modulus of the first cover sheet 50 is larger than the elastic modulus of the base member 20, is larger than the elastic modulus of the sensor sheet 30, and is larger than the elastic modulus of the protective sheet 40.

Action of First Embodiment

When using the displacement sensor 10, a user first removes the first cover sheet 50. Then, the displacement sensor 10 is adhered by an adhesive strength of the adhesive sheet 90 with the second main surface 20B side of the base member 20 facing a measurement target. The measurement target is, for example, a part of the body such as the neck of a subject. The displacement sensor 10 from which the first cover sheet 50 is removed curves as a whole according to the shape of the measurement target.

Then, after the measurement, the displacement sensor 10 is removed from the measurement target. Here, it is assumed that the displacement sensor 10 is stored without attaching the first cover sheet 50 onto the protective sheet 40. In this case, the curve of the displacement sensor 10 at the time of measurement may remain as an irreversible curve of the sensor sheet 30.

When the displacement sensor 10 is manufactured, the sensor sheet 30 is secured to the first main surface 20A of the base member 20 while a constant tensile force is being applied to the base member 20 and the sensor sheet 30 so that wrinkles or the like do not occur at the base member 20 and the sensor sheet 30.

Figure 4:
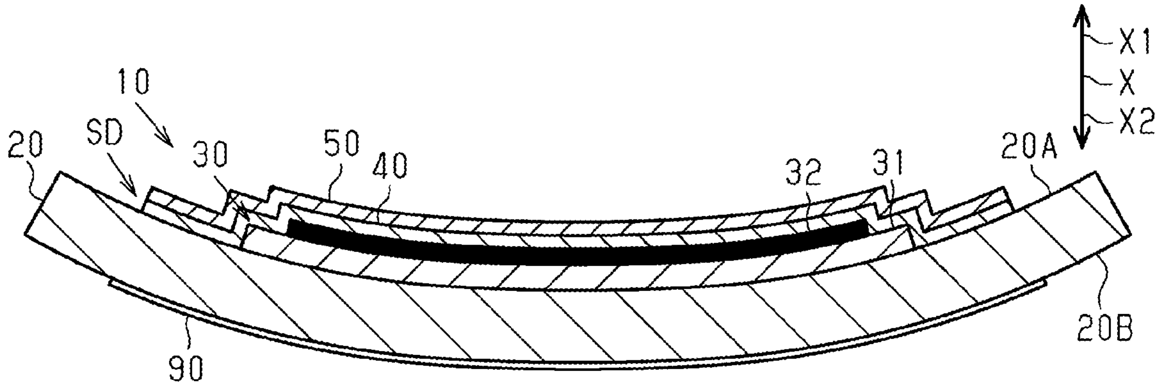
FIG. 4 is a diagram illustrating a form of a curve of a displacement sensor as a comparative example.

When the displacement sensor 10 is manufactured in this manner, the sensor sheet 30 is secured to the first main surface 20A of the base member 20 in a state in which the sensor sheet 30 is stretched as compared with the base member 20. Thus, as illustrated in FIG. 4, a contraction force is stronger on the first main surface 20A side of the base member 20 than on the second main surface 20B side. As a result, the displacement sensor 10 is highly likely to curve so as to protrude toward the first negative direction X2 side as a whole. Note that the above-described manner of the curve is an example, and the displacement sensor 10 may curve in a different manner depending on an external environment in which the displacement sensor 10 is stored.

Resistance Value Change Test

As for the displacement sensor 10 of the above-described embodiment, the displacement sensor 10 stored without the first cover sheet 50 attached thereto and the displacement sensor 10 stored with the first cover sheet 50 attached thereto were prepared. At this time, the two samples were stored for eight days in the same storage environment. Then, for each of the above-described samples, a resistance value of the sensor element 32 of the sensor sheet 30 was measured every day.

Figure 5:
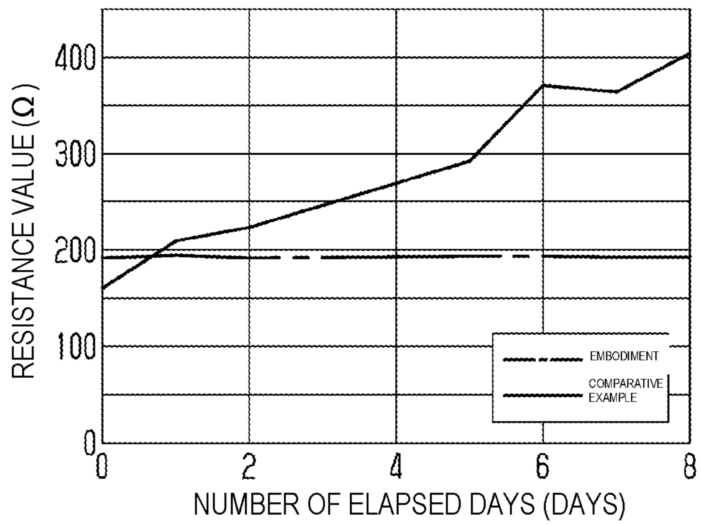
FIG. 5 is a diagram illustrating changes in resistance values when the displacement sensor according to the first embodiment and the displacement sensor according to the comparative example are stored.

As indicated by the solid line in the graph of FIG. 5, in the case of the displacement sensor 10 stored without attaching the first cover sheet 50, there was a tendency that the resistance value of the sensor element 32 increased as the storage period increased. In particular, the resistance value of the sensor element 32 after storage for eight days was twice or more the resistance value of the sensor element 32 at the start of the test. On the other hand, as indicated by the alternate long and short dash line in the graph of FIG. 5, in the case of the displacement sensor 10 stored with the first cover sheet 50 attached thereto, the resistance value of the sensor element 32 hardly changed even when the storage period became longer.

Effects of First Embodiment (1-1) In the above embodiment, the elastic modulus of the first cover sheet 50 is larger than that of the base member 20. That is, the first cover sheet 50 is less likely to deform than the base member 20. Thus, the first cover sheet 50 can suppress a curve of the base member 20. That is, a curve of the sensor sheet 30 positioned on the first main surface 20A of the base member 20 can also be suppressed. As a result, when the displacement sensor 10 is stored, a change in sensor characteristics due to the curves of the base member 20 and the sensor sheet 30 can be suppressed. Note that since the first cover sheet 50 is detachable, the first cover sheet 50 can be removed when the displacement sensor 10 is used. Accordingly, the first cover sheet 50 can be prevented from interfering with the use of the displacement sensor 10.

(1-2) In the above embodiment, the elastic modulus of the first cover sheet 50 is larger than that of the sensor unit SD. That is, the first cover sheet 50 is less likely to deform than the sensor unit SD. According to such a magnitude relationship between the elastic moduli, the curve of the sensor sheet 30 can be more reliably suppressed.

(1-3) In the above embodiment, the sensor sheet 30 is disposed on the base member 20 in a stretched state. Thus, the displacement sensor 10 is highly likely to curve so as to be recessed on the first positive direction X1 side and be protruded on the first negative direction X2 side. In such case, when the hard first cover sheet 50 is present on the side opposite to the base member 20, that is, on the recessed side of the curve, the curve of the displacement sensor 10 can be effectively suppressed.

(1-4) In the above embodiment, the first cover sheet 50 covers the entire region of the sensor sheet 30 in plan view from the normal direction of the first main surface 20A. Thus, the first cover sheet 50 can suppress the curve of the sensor sheet 30 in the entire region of the sensor sheet 30.

(1-5) In the above embodiment, the protective sheet 40 is positioned between the sensor sheet 30 and the first cover sheet 50. Thus, even when the first cover sheet 50 is removed and the displacement sensor 10 is used, the sensor sheet 30 can be prevented from coming into direct contact with other members.

(1-6) In the above embodiment, the elastic modulus of the first cover sheet 50 is larger than the elastic modulus of the protective sheet 40. In other words, the first cover sheet 50 is harder than the protective sheet 40. According to this configuration, plastic deformation of the protective sheet 40 can be suppressed by the presence of the first cover sheet 50.

According to the above-described configuration, since the first cover sheet 50 is less likely to deform when the first cover sheet 50 is peeled off from the protective sheet 40, the first cover sheet 50 can be easily peeled off from the protective sheet 40. It is assumed that the elastic modulus of the first cover sheet 50 is smaller than the elastic modulus of the protective sheet 40. In this case, when the first cover sheet 50 is peeled off from the protective sheet 40, the protective sheet 40 may be pulled together with the first cover sheet 50 in a direction parallel to the surface of the protective sheet 40 due to the movement of the protective sheet 40 in conjunction with the movement of the first cover sheet 50. In this way, when a tensile load is applied to the protective sheet 40 in the direction parallel to the protective sheet 40, the protective sheet 40 may be stretched and deformed. On the other hand, in the present embodiment, since the elastic modulus of the first cover sheet 50 is larger than the elastic modulus of the protective sheet 40, the first cover sheet 50 can be peeled off in a state where an angle with respect to the protective sheet 40 is, for example, equal to or less than 90 degrees. At this time, the protective sheet 40 is pulled in a direction substantially vertical to the surface of the protective sheet 40. However, since the protective sheet 40 is laminated and secured to the sensor sheet 30 and the base member 20, the deformation of the protective sheet 40 in the vertical direction is suppressed. Thus, according to the above-described configuration, the first cover sheet 50 can be peeled off from the protective sheet 40 while the deformation of the protective sheet 40 is being suppressed.

(1-7) In the above embodiment, when the displacement sensor 10 is used, the first cover sheet 50 is removed. Thus, when the displacement is measured using the displacement sensor 10, the measurement can be performed without being affected by the hardness of the first cover sheet 50. Moreover, even in a state in which the protective sheet 40 remains, since the protective sheet 40 is softer than the first cover sheet 50, the protective sheet 40 is unlikely to excessively inhibit the displacement of the sensor sheet 30.

Second Embodiment

Hereinafter, a second embodiment of the displacement sensor will be described. Note that in the displacement sensor 10 according to the second embodiment, the configurations of the sensor unit SD and the first cover sheet 50 are similar to those of the above-described embodiment. Configurations different from those of the first embodiment will be described below.

Second Cover Sheet

Figure 6:
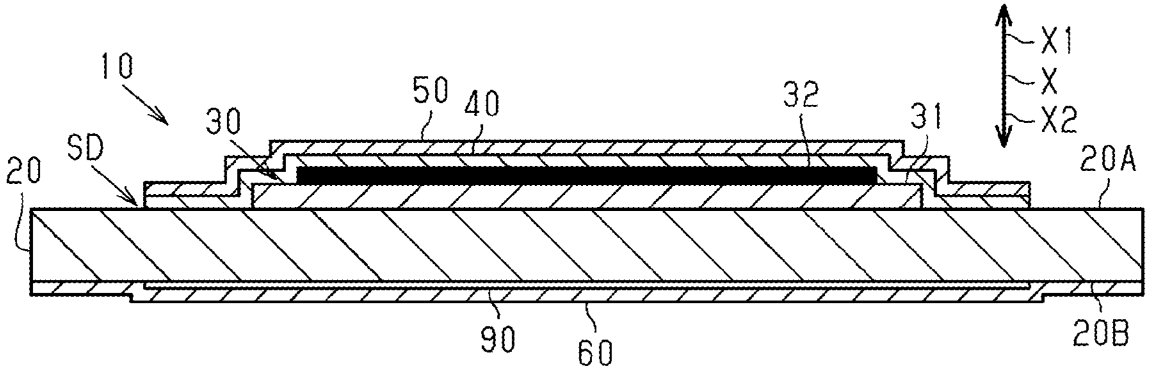
FIG. 6 is a cross-sectional view of a displacement sensor according to a second embodiment.

As illustrated in FIG. 6, the displacement sensor 10 further includes a second cover sheet 60 in addition to the first cover sheet 50 of the displacement sensor 10 of the first embodiment.

The second cover sheet 60 has a plate shape. A material of the second cover sheet 60 is the same as the material of the first cover sheet 50. The second cover sheet 60 is disposed on a side of the second main surface 20B opposite to the first main surface 20A to the base member 20 with the adhesive sheet 90 interposed therebetween. When viewed by the viewer facing the first positive direction X1 side, the second cover sheet 60 has the same substantially rectangular shape as that of the base member 20. The second cover sheet 60 covers the entire region of the base member 20. A thickness of the second cover sheet 60 is the same as the thickness of the first cover sheet 50, and is, for example, equal to or less than 0.1 mm.

The second cover sheet 60 is adhered to the second main surface 20B of the base member 20 with the adhesive sheet 90 interposed therebetween. As described above, the adhesive strength of the adhesive sheet 90 is an adhesive strength to such an extent as to allow the adhesive sheet 90 to be detachable from the measurement target. Thus, the second cover sheet 60 can be easily detached from the base member 20 by using a force by fingers or the like, and can be attached to the base member 20 again with the adhesive sheet 90 interposed therebetween. That is, the second cover sheet 60 is detachable from the base member 20.

Elastic Modulus

An elastic modulus of the second cover sheet 60 is larger than the elastic modulus of the sensor unit SD. That is, the elastic modulus of the second cover sheet 60 is larger than the elastic modulus of the sensor sheet 30, the elastic modulus of the protective sheet 40, and the elastic modulus of the base member 20. In other words, the second cover sheet 60 is harder than the sensor sheet 30, the protective sheet 40, and the base member 20. Additionally, the elastic modulus of the second cover sheet 60 is the same as the elastic modulus of the first cover sheet 50. Note that the elastic modulus of the adhesive sheet 90 is smaller than all of the elastic modulus of the second cover sheet 60, the elastic modulus of the sensor sheet 30, the elastic modulus of the protective sheet 40, and the elastic modulus of the base member 20.

Action of Second Embodiment

The sensor sheet 30 is secured to the base member 20 in a stretched state. In addition, in the second embodiment, the sensor sheet 30 is secured to the protective sheet 40 in a stretched state. In this way, when the sensor sheet 30 is in a state of being stretched with respect to both the base member 20 on the first negative direction X2 side and the protective sheet 40 on the first positive direction X1 side, it is difficult to make the direction of the curve of the sensor sheet 30 uniform. That is, the sensor sheet 30 according to the second embodiment is curved in various manners, such as being curved to protrude toward the first negative direction X2 side, being curved to protrude toward the first positive direction X1 side, or being curved to wave as a whole.

Effects of Second Embodiment (2-1) In the second embodiment, the second cover sheet 60 is disposed on the second main surface 20B side of the base member 20. Moreover, the elastic modulus of the second cover sheet 60 is larger than the elastic modulus of the base member 20. Thus, due to the presence of the second cover sheet 60, a curve of the base member 20 can be suppressed. That is, a curve of the sensor sheet 30 positioned on the first main surface 20A of the base member 20 can also be suppressed. In addition to the first cover sheet 50 on the first main surface 20A side of the base member 20, the second cover sheet 60 is provided on the opposite side to the first main surface 20A side. Thus, even when the displacement sensor 10 tries to be curved in any manner, the curve can be effectively suppressed.

(2-2) In the above-described embodiment, the second cover sheet 60 has a higher elastic modulus than that of the sensor unit SD. That is, the second cover sheet 60 is less likely to deform than the sensor unit SD. According to such a magnitude relationship between the elastic moduli, the curve of the sensor sheet 30 can be more reliably suppressed.

(2-3) In the above-described second embodiment, the second cover sheet 60 is secured to the surface of the adhesive sheet 90 facing the first negative direction X2 side. Accordingly, the second cover sheet 60 also functions as an antifouling sheet that prevents dust or the like from adhering to the adhesive sheet 90 during storage of the displacement sensor 10.

Modified Examples

The above-described embodiments and the following modified examples can be combined with each other as long as there is no technical contradiction.

In the above-described embodiments, the shape, thickness, and material of the base member 20 are not limited to the examples of the above-described embodiments. Further, in the above-described embodiments, as long as the elastic modulus of the base member 20 is smaller than the elastic moduli of the first cover sheet 50 and the second cover sheet 60, the shape, thickness, and material of the base member 20 are not limited to the examples of the above-described embodiments.

In the above-described embodiments, the shape, thickness, and material of the base material 31 are not limited to the examples of the above-described embodiments. Further, in the above-described embodiments, as long as the elastic modulus of the sensor sheet 30 is smaller than the elastic moduli of the first cover sheet 50 and the second cover sheet 60, the shape, thickness, and material of the base material 31 are not limited to the examples of the above-described embodiments.

In the above-described embodiments, the sensor element 32 is not limited to the sensor element that measures a displacement amount based on a resistance value, and may be replaced with a sensor element that measures a displacement amount based on a change in output voltage value, such as a piezoelectric sheet using polylactic acid.

In the above-described embodiments, the number of the sensor elements 32 is not limited as long as there is at least one sensor element 32. That is, the number of the sensor elements 32 may be one to four, or six or more.

In the above-described embodiments, the specific configuration of the sensor sheet 30 is not limited to the examples of the above-described embodiments as long as the magnitude of a strain can be measured. For example, the sensor sheet 30 may be an electrostatic capacity type sensor that includes a pair of electrodes and a dielectric layer positioned between the pair of electrodes and that measures the magnitude of a strain by detecting a change in electrostatic capacity. In addition, the sensor sheet 30 may detect the magnitude of a strain by using light, a camera, or the like. Further, the sensor sheet 30 may be constituted by a piezoelectric film.

In the above-described embodiments, as long as the base member 20, the sensor sheet 30, and the first cover sheet 50 are laminated in this order from the first negative direction X2 side in the displacement sensor 10, another layer may be disposed between these members. For example, another sheet may be positioned between the base member 20 and the sensor sheet 30.

In the embodiments described above, the shape, thickness, and material of the protective sheet 40 are not limited to the examples of the embodiments described above. Moreover, in the above-described embodiments, as long as the elastic modulus of the protective sheet 40 is smaller than the elastic moduli of the first cover sheet 50 and the second cover sheet 60, the shape, thickness, and material of the protective sheet 40 are not limited to the examples of the above-described embodiments.

In the embodiments described above, the protective sheet 40 can be omitted.

In the embodiments described above, the adhesive sheet 90 can be omitted. In this case, for example, a double-sided adhesive tape or the like may be adhered to the surface of the displacement sensor 10 that comes into contact with a measurement target.

In the embodiments described above, the shape, thickness, and material of the first cover sheet 50 are not limited to the examples of the embodiments described above. Further, in the above-described embodiments, as long as the elastic modulus of the first cover sheet 50 is larger than the elastic modulus of the base member 20, the shape, thickness, and material of the first cover sheet 50 are not limited to the examples of the above-described embodiments. The same applies to the second cover sheet 60 in this respect.

In the embodiments described above, the elastic modulus of each member may be confirmed by a method different from the examples of the embodiments described above. For example, the elastic modulus of the base member 20 may be confirmed by performing a test based on ISO1798:2008 and ISO8067:2008. In addition, the elastic modulus of the sensor unit SD may be confirmed by performing a test based on ISO37:2011. Also, the elastic moduli of the first cover sheet 50 and the second cover sheet 60 may be confirmed by performing a test based on ISO527-1:2012.

In the second embodiment, the material of the first cover sheet 50 and the material of the second cover sheet 60 may be different from each other. Further, the elastic modulus of the first cover sheet 50 and the elastic modulus of the second cover sheet 60 may be different from each other.

In the second embodiment, the first cover sheet 50 can be omitted. For example, in the example illustrated in FIG. 7, the displacement sensor 10 includes the sensor unit SD including the base member 20, the sensor sheet 30, and the protective sheet 40, the adhesive sheet 90, and the second cover sheet 60. In addition, the base material 31 and the sensor elements 32 of the sensor sheet 30, and the protective sheet 40 are laminated in this order on the first main surface 20A side of the base member 20. Additionally, on the second main surface 20B side, the adhesive sheet 90 and the second cover sheet 60 are laminated in this order. The elastic modulus of the second cover sheet 60 is larger than the elastic modulus of the base member 20.

Figure 7:
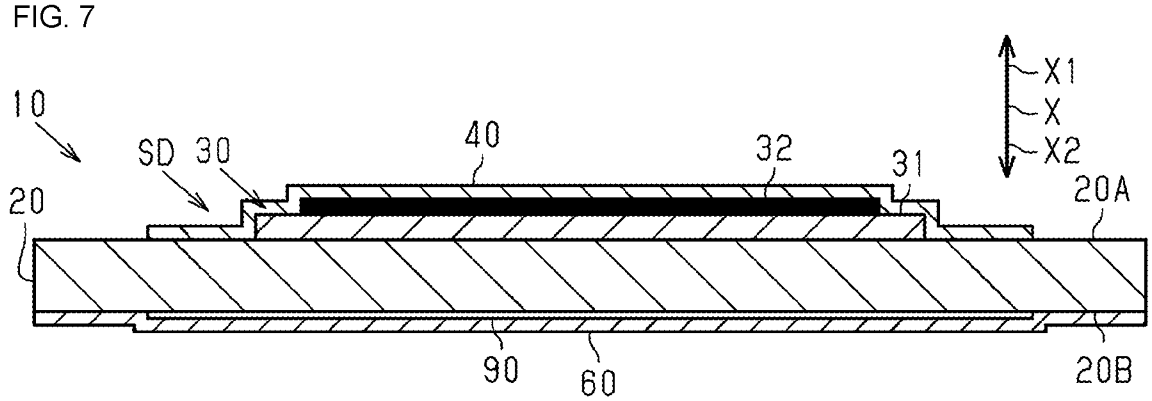
FIG. 7 is a cross-sectional view of a displacement sensor according to a modified example.

In the example illustrated in FIG. 7, the second cover sheet 60 can suppress a curve of the base member 20. Thus, it is possible to suppress a curve of the sensor sheet 30 that curves together with the base member 20. Also in the example illustrated in FIG. 7, the protective sheet 40 and the adhesive sheet 90 can be omitted.

In each embodiment, the sensor sheet 30 does not need to be secured to the base member 20 in a stretched state. However, in the example illustrated in FIG. 7, it is preferable that the base member 20 be secured to the sensor sheet 30 in a stretched state. In this case, a contracting force is stronger on the second main surface 20B side of the base member 20 than on the first main surface 20A side. As a result, the displacement sensor 10 as a whole is highly likely to curve so as to protrude toward the first positive direction X1 side. In such case, when the second cover sheet 60 is positioned on the second main surface 20B side, the curve of the displacement sensor 10 can be effectively suppressed.

Figure 8:
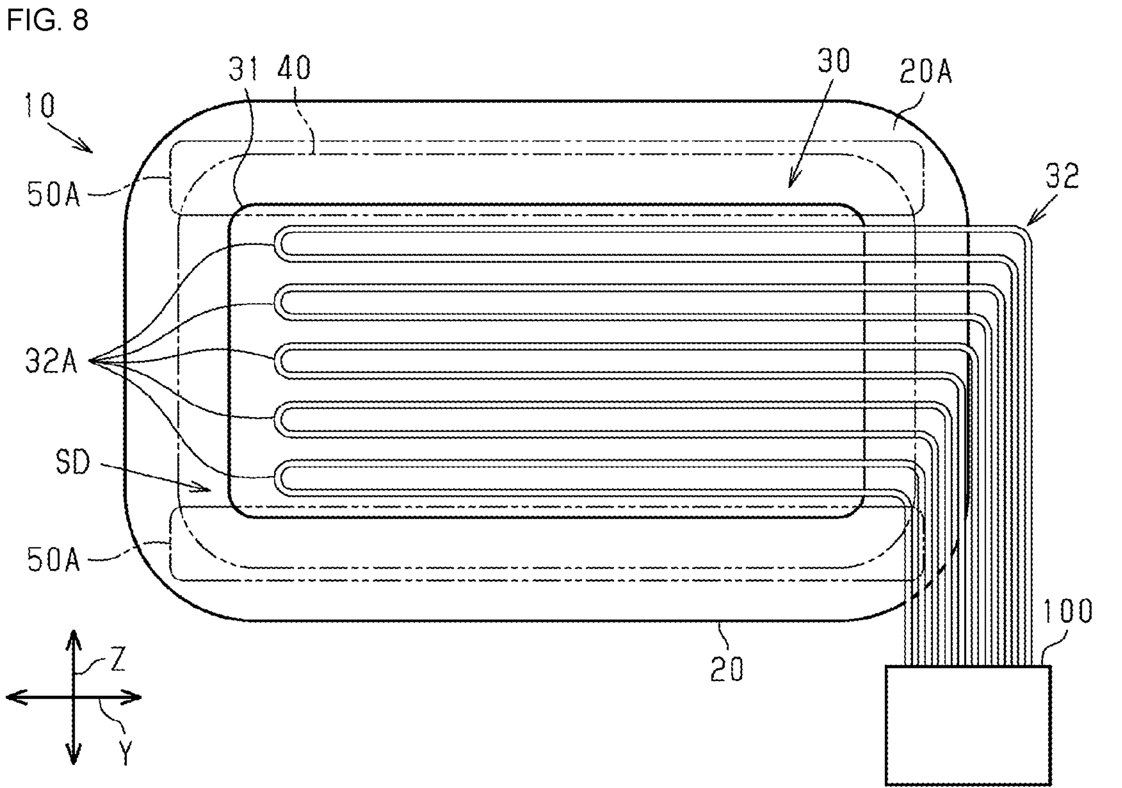
FIG. 8 is a plan view of the displacement sensor according to the modified example.

In the first embodiment, the first cover sheet 50 does not need to cover the entire sensor sheet 30. That is, when viewed by the viewer facing the first negative direction X2, an area of the first cover sheet 50 may be smaller than an area of the sensor sheet 30. For example, in the example illustrated in FIG. 8, the displacement sensor 10 includes two first cover sheets 50A. One first cover sheet 50A extends along one long side of the sensor sheet 30. That is, the first cover sheet 50A covers the one long side of the sensor sheet 30. Additionally, the other first cover sheet 50A extends along the other long side of the sensor sheet 30. That is, the first cover sheet 50A covers the other long side of the sensor sheet 30. Then, the two first cover sheets 50A are separated from each other in the direction along the third axis Z. As a result, when viewed by the viewer facing the first negative direction X2, a part of the sensor sheet 30 is not covered with the first cover sheets 50A. As described above, even in the configuration in which the first cover sheet 50 covers the part of the sensor sheet 30, a curve of the sensor sheet 30 can be suppressed. Additionally, in the example illustrated in FIG. 8, the number of the first cover sheets 50 may be one.

In addition, in a case where the first cover sheet 50 does not cover the entire sensor sheet 30, as long as the first cover sheet 50 covers a part of the sensor sheet 30, the shape and position of the first cover sheet 50 are not limited. However, when the first cover sheet 50 does not cover the entire sensor sheet 30, it is preferable that the first cover sheet 50 be long in a direction in which the detection portions 32A of the sensor elements 32 extend.

Technical ideas that can be derived from the above-described embodiments and modified examples will be described below.

[1] A displacement sensor comprising: a sensor unit including a base member having a first main surface and a second main surface opposite the first main surface, and a sensor sheet on the first main surface of the base member, the sensor sheet configured to measure a displacement amount of the base member; and a first cover sheet detachably attached to the sensor sheet on a side thereof opposite to the base member, wherein an elastic modulus of the first cover sheet is larger than an elastic modulus of the base member.

[2] The displacement sensor according to [1], wherein the elastic modulus of the first cover sheet is larger than an elastic modulus of the sensor unit.

[3] The displacement sensor according to [2], wherein the sensor sheet is secured to the base member in a stretched state as compared with the base member.

[4] The displacement sensor according to any one of [1] to [3], wherein the sensor unit further includes a protective sheet between the sensor sheet and the first cover sheet.

[5] The displacement sensor according to any one of [1] to [4], further comprising: a second cover sheet detachably disposed on a side of the second main surface of the base member, wherein an elastic modulus of the second cover sheet is larger than the elastic modulus of the base member.

[6] The displacement sensor according to [5], wherein the elastic modulus of the second cover sheet is larger than an elastic modulus of the sensor unit.

[7] A displacement sensor comprising: a sensor unit including a base member having a first main surface and a second main surface opposite the first main surface, and a sensor sheet on the first main surface of the base member, the sensor sheet configured to measure a displacement amount of the base member; a first cover sheet detachably disposed on a side of the second main surface of the base member, wherein an elastic modulus of the first cover sheet is larger than an elastic modulus of the base member.

[8] The displacement sensor according to [7], wherein the elastic modulus of the first cover sheet is larger than an elastic modulus of the sensor unit.

[9] The displacement sensor according to any one of [1] to [8], wherein the first cover sheet covers an entire region of the sensor sheet in plan view from a normal direction of the first main surface.

What is claimed is:

1. A displacement sensor comprising:

a sensor unit including a base member having a first main surface and a second main surface opposite the first main surface, and a sensor sheet on the first main surface of the base member, the sensor sheet configured to measure a displacement amount of the base member; and a first cover sheet configured to be detachably attached to the sensor sheet on a side thereof opposite to the base member, wherein an elastic modulus of the first cover sheet is larger than an elastic modulus of the base member.

2. The displacement sensor according to claim 1, wherein the elastic modulus of the first cover sheet is larger than an elastic modulus of the sensor unit.

3. The displacement sensor according to claim 2, wherein the sensor sheet is secured to the base member in a stretched state as compared with the base member.

4. The displacement sensor according to claim 1, wherein the elastic modulus of the first cover sheet is larger than an elastic modulus of the sensor sheet.

5. The displacement sensor according to claim 1, wherein the sensor unit further includes a protective sheet between the sensor sheet and the first cover sheet.

6. The displacement sensor according to claim 5, wherein the elastic modulus of the first cover sheet is larger than an elastic modulus of the sensor unit.

7. The displacement sensor according to claim 5, wherein the elastic modulus of the first cover sheet is larger than an elastic modulus of the sensor sheet.

8. The displacement sensor according to claim 7, wherein the elastic modulus of the first cover sheet is larger than an elastic modulus of the protective sheet.

9. The displacement sensor according to claim 5, wherein the elastic modulus of the first cover sheet is larger than an elastic modulus of the protective sheet.

10. The displacement sensor according to claim 1, further comprising an adhesive sheet on the second main surface of the base member.

11. The displacement sensor according to claim 1, further comprising:

a second cover sheet detachably disposed on a side of the second main surface of the base member, wherein an elastic modulus of the second cover sheet is larger than the elastic modulus of the base member.

12. The displacement sensor according to claim 11, wherein the elastic modulus of the second cover sheet is larger than an elastic modulus of the sensor unit.

13. The displacement sensor according to claim 11, further comprising an adhesive sheet between the second main surface of the base member and the second cover sheet.

14. The displacement sensor according to claim 11, wherein the elastic modulus of the second cover sheet is the same as the elastic modulus of the first cover sheet.

15. The displacement sensor according to claim 1, wherein the first cover sheet covers an entire region of the sensor sheet in a plan view from a normal direction of the first main surface.

16. The displacement sensor according to claim 1, wherein the first cover sheet covers a part of the sensor sheet in a plan view from a normal direction of the first main surface.

17. A displacement sensor comprising:

a sensor unit including a base member having a first main surface and a second main surface opposite the first main surface, and a sensor sheet on the first main surface of the base member, the sensor sheet configured to measure a displacement amount of the base member;

a cover sheet configured to be detachably disposed on a side of the second main surface of the base member, wherein an elastic modulus of the cover sheet is larger than an elastic modulus of the base member.

18. The displacement sensor according to claim 17, wherein the elastic modulus of the cover sheet is larger than an elastic modulus of the sensor unit.

19. The displacement sensor according to claim 17, wherein the cover sheet covers an entire region of the sensor sheet in a plan view from a normal direction of the first main surface.

20. The displacement sensor according to claim 1, wherein the first cover sheet is a non-stretchable synthetic resin.

* * * * *